US010722844B2

(12) United States Patent
Seng

(10) Patent No.: US 10,722,844 B2
(45) Date of Patent: Jul. 28, 2020

(54) SELECTIVE CATALYTIC REDUCTION PROCESS AND METHOD OF REGENERATING DEACTIVATED SCR CATALYST OF A PARALLEL FLUE GAS TREATING SYSTEM

(71) Applicant: SHELL OIL COMPANY, Houston, TX (US)

(72) Inventor: Guido Seng, The Woodlands, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/543,035

(22) Filed: Aug. 16, 2019

(65) Prior Publication Data

US 2020/0061537 A1 Feb. 27, 2020

Related U.S. Application Data

(60) Provisional application No. 62/721,236, filed on Aug. 22, 2018.

(51) Int. Cl.
*B01D 53/96* (2006.01)
*B01D 53/94* (2006.01)
(Continued)

(52) U.S. Cl.
CPC ......... *B01D 53/9436* (2013.01); *B01D 53/56* (2013.01); *B01D 53/90* (2013.01);
(Continued)

(58) Field of Classification Search
CPC .. B01D 53/56; B01D 53/565; B01D 53/8631; B01D 2255/9045; B01D 2257/402;
(Continued)

(56) References Cited

U.S. PATENT DOCUMENTS 4,656,148 A * 4/1987 Buhler ............... B01D 53/8628
422/110
5,406,790 A * 4/1995 Hirota ................ B01D 53/0454
60/276

(Continued)

FOREIGN PATENT DOCUMENTS

CN 102658013 A 9/2012
CN 203856549 U 10/2014
(Continued)

OTHER PUBLICATIONS

International Search Report and Written Opinion received for PCT Patent Application No. PCT/US2019/046877, dated Nov. 11, 2019,09 pages.
(Continued)

*Primary Examiner* — Timothy C Vanoy

(57) ABSTRACT

Presented is a process for the regeneration of a deactivated nitrogen oxide decomposition catalyst of a selective catalytic reduction system that is a component of a flue gas treating system that is one of parallel flue gas treating systems. The selective catalytic reduction system is isolated to provide a closed system in which a regeneration gas is circulated to regenerate the deactivated nitrogen oxide decomposition catalyst. Denitrified flue gas from a parallel flue gas treating system is introduced and used within the closed system as regeneration gas.

15 Claims, 1 Drawing Sheet

(51) Int. Cl.
  *B01D 53/90* (2006.01)
  *B01D 53/56* (2006.01)
  *F23J 15/02* (2006.01)
  *F23J 11/12* (2006.01)
(52) U.S. Cl.
  CPC .............. *B01D 53/96* (2013.01); *F23J 15/02* (2013.01); *F23J 11/12* (2013.01)
(58) Field of Classification Search
  CPC ....... B01D 2257/404; B01D 2258/0283; B01J 19/0046; B01J 19/2445; B01J 23/90; B01J 27/28; B01J 38/04
  See application file for complete search history.

(56) References Cited

U.S. PATENT DOCUMENTS

| | | | |
|---|---|---|---|
| 6,419,889 | B1 | 7/2002 | Boxhoorn et al. |
| 8,758,711 | B2 | 6/2014 | Yonemura et al. |
| 8,883,106 | B2 | 11/2014 | Buschmann et al. |
| 2011/0138788 | A1* | 6/2011 | Kanda .................... B01D 53/56 60/299 |

FOREIGN PATENT DOCUMENTS

| | | | | |
|---|---|---|---|---|
| CN | 105688936 | A | 6/2016 | |
| CN | 107088365 | A * | 8/2017 | ......... B01D 53/8631 |
| CN | 107913598 | A | 4/2018 | |
| EP | 1576999 | A1 * | 9/2005 | ......... B01D 53/8653 |
| EP | 1676626 | A1 | 7/2006 | |
| EP | 2687283 | A1 | 1/2014 | |
| EP | 2742990 | A1 | 6/2014 | |
| EP | 3002059 | A1 | 4/2016 | |
| EP | 3002060 | A1 | 4/2016 | |
| JP | H10192657 | A | 7/1998 | |
| JP | 2004330132 | A | 11/2004 | |
| KR | 101110665 | B1 | 2/2012 | |
| KR | 20170059159 | A | 5/2017 | |
| WO | 2017112615 | A1 | 6/2017 | |
| WO | 2017208502 | A1 | 12/2017 | |

OTHER PUBLICATIONS

International Search Report and Written Opinion received for PCT Patent Application No. PCT/US2019/046864, dated Oct. 24, 2019, 10 pages.

International Search Report and Written Opinion received for PCT Patent Application No. PCT/US2019/046888, dated Oct. 24, 2019, 10 pages.

Sobolewski et al., "Steag's Long-term Catalyst Operating Experience and Cost", Proceedings of the 2006 Environmental Controls Conference, Jan. 2006, 18 Pages, XP055362117.

* cited by examiner

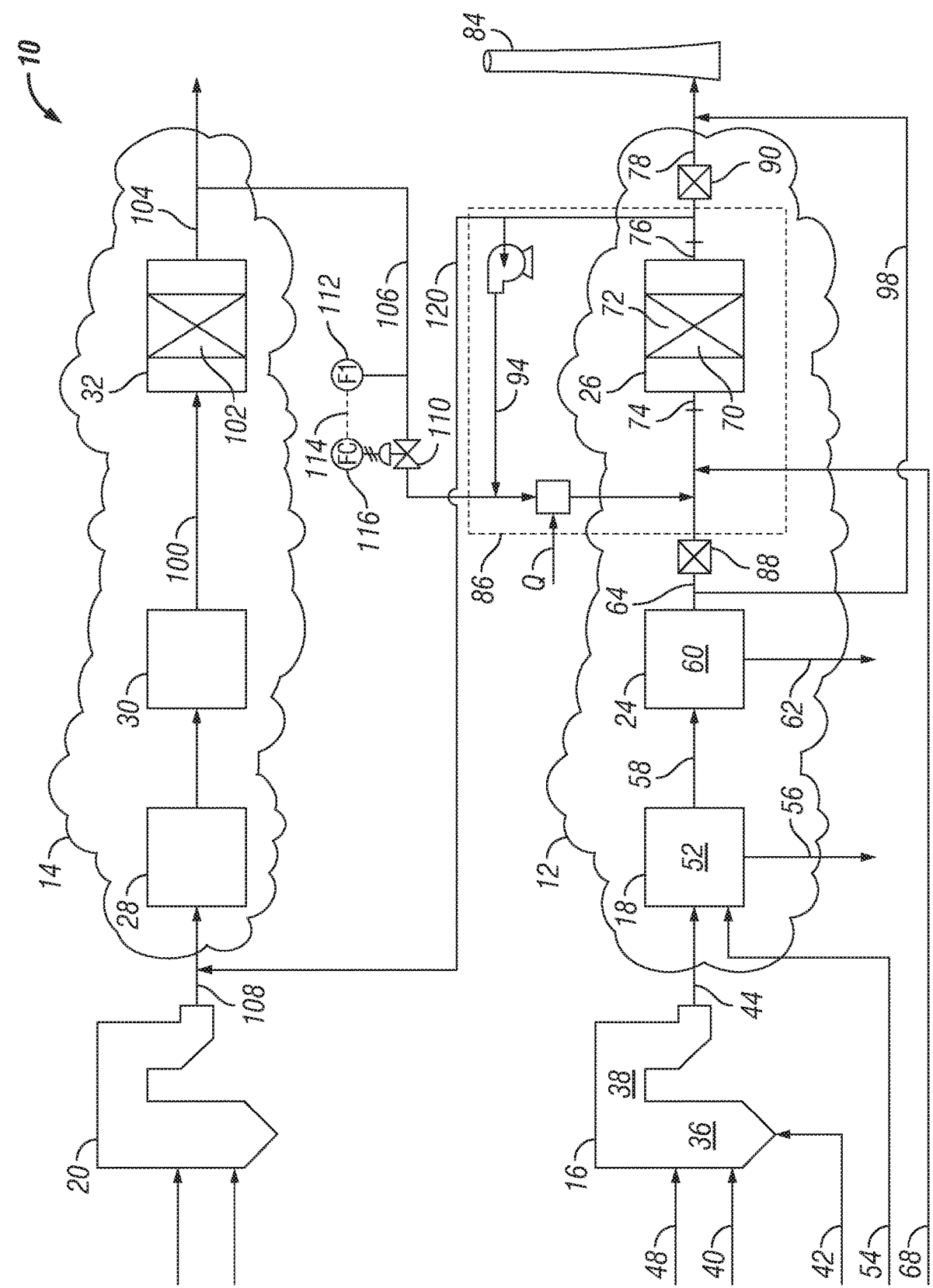

US 10,722,844 B2

SELECTIVE CATALYTIC REDUCTION PROCESS AND METHOD OF REGENERATING DEACTIVATED SCR CATALYST OF A PARALLEL FLUE GAS TREATING SYSTEM

The present Non-Provisional application claims the benefit of U.S. Provisional Patent Application Ser. No. 62/721,236 filed Aug. 22, 2018, the entire disclosure of which is hereby incorporated by reference.

FIELD OF THE INVENTION

This invention relates to a catalytic process for the removal of nitrogen oxides and sulfur oxides from a hot process gas stream, containing nitrogen oxides and sulfur oxides, and for regenerating a deactivated catalyst of the process.

BACKGROUND OF THE INVENTION

The combustion of a fuel source, such as coal, oil, gas, wood, municipal waste, industrial waste, hospital waste, hazardous waste and agricultural waste, in furnaces or boilers generates hot flue gases that contain combustion products such as carbon monoxide, carbon dioxide, nitrogen oxides, sulfur compounds, and other contaminants. Included among these other contaminants are particulates. The particulates may include fly ash, dust, smoke, and other fine particulate matter that can comprise phosphorous, heavy metals, alkali metals and alkaline earth metals. The nitrogen oxides ($NO_x$) contained in the hot flue gas streams include nitric oxide (NO) and nitrogen dioxide ($NO_2$). The sulfur compounds include the sulfur oxides ($SO_x$) such as sulfur dioxide ($SO_2$) and sulfur trioxide ($SO_3$). The sulfur compounds result from the presence of sulfur in the combustion fuel.

A common method for removing $NO_x$ from the flue gas streams of combustion processes is the selective catalytic reduction (SCR) process. This process involves the catalytic reduction of $NO_x$ to nitrogen ($N_2$) and water ($H_2O$) by reaction of $NO_x$ with ammonia ($NH_3$) within a catalyst bed. The primary reactions of the SCR process are presented as follows:

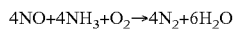

$$4NO+4NH_3+O_2 \rightarrow 4N_2+6H_2O$$

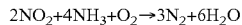

$$2NO_2+4NH_3+O_2 \rightarrow 3N_2+6H_2O$$

$$NO+NO_2+2NH_3 \rightarrow 2N_2+3H_2O$$

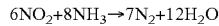

$$6NO_2+8NH_3 \rightarrow 7N_2+12H_2O$$

The catalyst bed usually includes a catalytically active material, such as a nitrogen oxide decomposition catalyst, also referred to herein as deNOx catalyst, that can comprise a metal oxide and a catalytically active metal component such as titanium, tungsten, molybdenum, vanadium or other suitable compounds known to catalyze the conversion of nitrogen oxides to molecular nitrogen and water. Examples of catalytically active materials are vanadium pentoxide ($V_2O_5$) and tungsten trioxide ($WO_3$).

One problem with the use of the deNOx catalyst of the SCR process in treating combustion flue gas streams is that over time they become contaminated and deactivated by the deposition of particulates and reaction products of ammonia with the sulfur compounds of the hot flue gas stream. These products include, for example, ammonium sulfate and ammonium bisulfate. Other ammonium salts, such as ammonium chloride and ammonium nitrate, formed by the reaction of injected ammonia with components of the flue gas stream, also may deposit on the deNOx catalyst. When the deNOx catalyst becomes deactivated due to deposition of ammonium salts, there is a need to regenerate the catalyst to restore at least a portion of its lost activity.

U.S. Pat. No. 8,883,106 describes one method of regeneration of deNOx catalyst. This patent presents a selective catalytic reduction reactor system for removing nitrogen oxides and sulfur oxides from hot process gas. The reactor system has structural features that provide for an on-line process for regenerating its catalytic elements. This system includes multiple catalyst bed segments arranged in parallel with the flow of the hot process gas that is treated by use of the system. The patent further discloses a method of regenerating the catalyst bed segments. The regeneration method includes isolating one of the catalyst bed segments from the flow of hot process gas and passing a regenerating gas through the isolated catalyst bed segment while the other catalyst bed segments are in simultaneous use to remove nitrogen oxide and sulfur oxide from the hot process gas.

EP 2 687 283 describes another method of regeneration of deNOx catalyst. This publication shows a gas treatment system or facility used for nitrogen oxide removal from a gas stream by catalytic reduction of the nitrogen oxides contained in the gas stream. The gas treatment system includes a reactor system having multiple separate reactors or compartments with catalyst structured to allow for the regeneration of the catalyst of an individual reactor or compartment while using the other reactors or compartments with catalyst in the treatment of the gas stream. The system further includes a dechlorination/desulfurization unit that is located upstream of the reactor system and provides for the treatment of the gas stream. The system also includes a gas treatment circuit and a regeneration circuit. The gas treatment circuit provides for the denitrification of the gas stream by supplying the gas stream to and through the catalyst modules of the reactor system while the regeneration circuit provides for the regeneration of a portion of the catalyst of the reactor system by circulating a regeneration gas through its other catalyst modules. The regeneration off-gas is combined with the gas stream fed to the dichlorination/desulfurization treatment.

Some of the problems with these prior art flue gas catalytic denitrification systems that provide for on-line methods of catalyst regeneration arise from the systems having equipment that is structured with separate reactors or compartments. These separate reactors or compartments are isolated from each other to allow for regeneration of a single reactor or compartment simultaneously with the use of the remaining reactors or compartments in treating the flue gas stream. These regeneration methods require complicated structural features that include separate reactors or compartments as well as valving and switching systems that are expensive and difficult to use and to control.

It is an ongoing desire to provide improved catalytic gas treating systems that are easier to use and require less cost than many of the prior art systems.

SUMMARY OF THE INVENTION

Accordingly, a process is provided for the selective catalytic reduction of nitrogen oxides contained in a gas stream and the regeneration of a deactivated SCR catalyst. This process includes providing a first processed flue gas stream, containing nitrogen oxides and sulfur compounds, and a second processed flue gas stream, containing nitrogen oxides and sulfur compounds. The first processed flue gas stream is passed to a first SCR system having an upstream inlet and a downstream outlet and includes a first SCR catalyst, wherein the first processed flue gas stream is contacted with the first SCR catalyst in the presence of ammonia for a time sufficient to provide a deactivated first SCR catalyst deactivated by sulfur compounds. During this time, the first SCR system yields a first denitrified flue gas stream for discharge into a stack. The second processed flue gas stream passes to a second SCR system that includes a second SCR catalyst from which a second denitrified flue gas stream is yielded for discharge. Once the deactivated first SCR catalyst is provided, passing of the first processed flue gas stream to the first SCR system is discontinued by isolating the first SCR system thereby providing a closed system. A portion of the second denitrified flue gas stream is then introduced at an introduction rate into the closed system as a regeneration gas used to regenerate the first SCR catalyst and to yield a regeneration effluent gas containing SOx and ammonia. All or part of the regeneration effluent gas is circulated at a circulation rate from the downstream outlet to the upstream inlet. At least a portion of the regeneration effluent gas is removed at a removal rate from the closed system and introduced into a parallel flue gas treating system that includes a second acid gas removal unit, a second particulate removal unit and the second SCR system, wherein the parallel flue gas treating system provides for removing at least a portion of the SOx and ammonia contained in the regeneration effluent gas of the first SCR system.

BRIEF DESCRIPTION OF THE DRAWINGS

The FIGURE is a schematic flow diagram illustrating an embodiment of the inventive process.

DETAIL DESCRIPTION OF THE INVENTION

The invention provides a process for treating combustion flue gases by using parallel flue gas treatment lines or systems. Each combustion flue gas stream is generated by burning a fuel source within a separate furnace or boiler. These combustion flue gas streams pass through their respective flue gas treatment lines to one or more flue-gas stacks for exhaustion into the outside atmosphere. The typical flue gas stream generated by each of the furnaces or boilers contains nitrogen oxides, sulfur oxides, and particulates that need to be reduced before releasing the flue gas stream into the atmosphere.

Each of the parallel flue gas treatment lines of the inventive process includes several different types of treating units that are integrated to provide for removal of the different contaminants that are contained in its flue gas stream. Included among the treatment units may be an acid gas removal unit for removing acid gases, such as sulfur oxides ($SO_2$ and $SO_3$) and HCl, from a flue gas stream to provide a desulfurized flue gas stream, and a particulates removal unit for removing particulates from a flue gas stream to provide a cleaned gas stream. These treatments of each flue gas stream together provide processed flue gas streams that are fed to the SCR systems. The order of applying the acid gas removal step and particulates removal step depends upon the type of desulfurization treatment provided by the acid gas removal unit and may include acid gas removal followed by particulates removal, or, alternatively, particulates removal followed by acid gas removal, to provide the processed flue gas streams for introduction into the SCR systems.

Each of the parallel flue gas treatment lines of the process separately provides a processed flue gas stream that is passed to an SCR system for treatment to remove nitrogen oxides. Included in the parallel flue gas treatment systems is a first flue gas treatment line that provides a first processed flue gas stream and a second flue gas treatment line that provides a second processed flue gas stream. The processed flue gas streams are processed in the sense that they have undergone treatment to remove sulfur compounds and particulate material. They may also have been treated by selective non-catalytic reduction of the nitrogen oxides contained in the combustion flue gases within each boiler upstream of the SCR systems.

Both the first processed flue gas stream and the second processed flue gas stream contains nitrogen oxides that are formed by the combustion of fuel sources respectively within a first furnace or boiler of the first flue gas treating line or system and a second furnace or boiler of the parallel flue gas treating line or system. These processed flue gas streams, thus, comprise nitrogen oxides, such as $N_2O$, NO, $NO_2$ and any combination thereof, and unremoved sulfur oxides and particulates.

The first processed flue gas stream passes to a first selective catalytic reduction (SCR) system that is a part of the first flue gas treating system of the process. The first SCR system provides for removing nitrogen oxides from the first processed flue gas stream. It does this by the catalyzed reduction of NOx to $N_2$ and water by reacting NOx with injected ammonia or urea within a bed of first SCR catalyst, or deNOx catalyst, contained within the first SCR system.

The second processed flue gas stream separately passes to a second selective catalytic reduction (SCR) system that is a part of the parallel or second flue gas treating system of the process. The second SCR system provides for removing nitrogen oxides from the second processed flue gas stream. It also does this by the catalyzed reduction of NOx to $N_2$ and water by reacting NOx with injected ammonia or urea within a bed of second SCR catalyst, or deNOx catalyst, contained within the second SCR system.

The selective non-catalytic reduction of the nitrogen oxides contained in the combustion flue gases generated by each of the boilers of the process system is done upstream of each SCR system. This treatment includes introducing either ammonia or urea into the boiler at a location where the temperature of the hot flue gas within the boiler is in the range of from 760° C. (1400° F.) to 1090° C. (1994° F.). At these temperatures, urea decomposes to ammonia and the nitrogen oxides react with ammonia and oxygen to form molecular nitrogen and water. The efficiency of the selective non-catalytic reduction is typically low and may be in the range of from 5% to 50% conversion of the nitrogen oxides contained in the hot flue gas.

Whether the hot flue gas streams discharged from the boilers are treated by selective non-catalytic reduction, or not treated by selective non-catalytic reduction, each of the hot flue gas streams contains concentrations of combustion products that include nitrogen oxides, sulfur compounds, and other contaminants. The concentration of the nitrogen oxides in each of the first hot flue gas stream and the second hot flue gas stream can be in the range of from 50 ppmw to 5,000 ppmw. More typically, however, the nitrogen oxides concentration is in the range of from 75 ppmw to 500 ppmw. Each hot flue gas stream further can have a concentration of sulfur compounds in the range of from 10 ppmw to 2,000 ppmw, or, more typically, from 35 ppmw to 350 ppmw. The amount of particulates material contained in each of the first hot flue gas stream and the second hot flue gas stream generally is in the range of from 0 mg/m$^3$ to 30,000 mg/m$^3$ of the respective flue gas streams, but, more typically, from 5,000 mg/m$^3$ to 20,000 mg/m$^3$, at standard pressure and temperature conditions.

In the first flue gas treating line, a first hot flue gas stream, comprising at least one acid gas component such as sulfur dioxide and sulfur trioxide ($SO_2$ and $SO_3$), passes from the first furnace or boiler and to a first acid gas removal unit or system for treating the first flue gas stream to remove at least a portion of its acid gas components. The first acid gas removal unit of the process, thus, provides means or method for removing from the first flue gas stream at least a portion of the acid gas components contained in the first flue gas stream.

Any suitable acid gas removal system known to those skilled in the art may be used to accomplish the removal of acid gas components from the first flue gas stream. Common methods for removing acid gas, particularly, sulfur dioxide and sulfur trioxide as well as other acid gas components like hydrogen chloride, from the flue gas stream are by wet scrubbing and dry or semi-dry processes. These processes use either a dry alkaline sorbent or a solution of alkaline sorbent or a slurry of a solid alkaline sorbent to remove the sulfur dioxide, trioxide and other acid gas components from the flue gas stream. A suitable alkaline sorbent of the treatment slurry or solution can be selected from the group of alkaline sorbents consisting of calcium carbonate ($CaCO_3$, limestone), calcium hydroxide ($Ca(OH)_2$ hydrated lime), magnesium hydroxide ($Mg(OH)_2$), and caustic sodai (NaOH).

In the wet scrubbing and semi-dry treatment methods for removing acid gases, the flue gas stream is contacted with a slurry or solution of the alkaline sorbent under suitable conditions for removing sulfur from the flue gas stream. Typically, the method uses a vessel that defines a contacting zone within which the sorbent slurry or solution is sprayed concurrently, counter-currently, or cross-currently with the flow of the flue gas stream introduced into the contacting zone of the vessel. The sulfur in the flue gas stream reacts with the alkaline sorbent which removes at least a portion of the sulfur content in the flue gas stream to yield a desulfurized flue gas stream.

Another suitable method for removing acid gases from the flue gas stream includes the so-called dry method. In the suitable dry treatment methods of the invention, an alkaline material such as sodium bicarbonate ($NaHCO_3$), in powder form, is brought into contact with the flue gas stream within a contacting zone defined by a vessel or any other suitable contacting means. The acid gases of the flue gas stream react with the alkaline material within the contacting zone of the vessel to form solid salts that are removed from the contacting zone.

The amount of $SO_2$ contained in the flue gas stream that is removed by the acid gas removal unit can be in the range upwardly to 85%, or up to 95%, or even up to greater than 95% or 99% of the $SO_2$ contained in the flue gas stream. Typically, the amount of $SO_2$ removed from the flue gas stream can be in the range of from 10% to 80%, and, more typically, the $SO_2$ removal is in the range of from 30 to 75%.

While wet acid gas removal systems require placement of the particulate removal system upstream of the unit, semi-dry and dry systems do not require the placement of the particulate removal system upstream, but it would be installed downstream of the acid gas removal unit. In either case, the first flue gas stream passes to a first particulate removal unit or system for removing at least a portion of the particulates material contained in the first flue gas stream. The first particulate removal unit is a filtration device that provides means and method for removing particles from the first flue gas stream to yield the first processed flue gas stream that passes to the first SCR system. The SCR system is installed downstream of both the particulate removal unit and the acid gas removal unit.

Any suitable particulates removal system known to those skilled in the art is used to accomplish the removal of the particulates material from the flue gas stream. Thus, the particulates material is removed by any suitable particulates removal means or method. Typical systems, however, include electrostatic precipitators and baghouse filter systems. The electrostatic precipitators remove the particles from the flue gas stream by the application of electrostatic force to separate the particles contained in the flue gas stream. The baghouse filter systems remove the particulates using woven or felted fabric materials as a filter medium.

The particulates contained in the flue gas stream are predominantly in a size range of from 0.5 microns (μm) to 300 microns (μm) with greater than 70 wt. % of the particles, and, more particularly, from 70 to 98 wt. % of the particles, having a particle size within the range of from 0.5 μm to 300 μm. The baghouse filter systems can remove upwardly to or greater than 99% of the particulates contained in the flue gas stream to provide the processed flue gas stream of the flue gas treating process. Typically, the percentage of particulates removed from the flue gas stream is in the range of from 80% to 99.9% of the particulates to provide the processed flue gas stream ready for processing by a selective catalytic reduction (SCR) system.

The SCR catalyst of each SCR system of the process can be any deNOx catalyst or catalyst system known to those skilled in the art that catalyzes the reduction of nitrogen oxide compounds contained in the flue gas stream to molecular nitrogen and water by the reaction of the nitrogen oxide compounds with ammonia. The first SCR system and second SCR system respectively includes a first SCR catalyst and a second SCR catalyst, each of which is selected from a variety of deNOx catalyst compositions having any suitable structural form or shape.

The SCR catalyst, or deNOx catalyst, for each of the SCR systems of the process can comprise a base metal catalyst, which typically includes titanium oxide or vanadium oxide as a carrier. The carrier may further include another metal oxide. The carrier also may have any suitable shape or structure such as a honeycomb structure, or a ceramic metal or foam structure, or it is an agglomerate, such as an extrudate, a pill, and a ball. The deNOx catalyst can further comprise one or more active metal components selected from the group of metals consisting of vanadium, tungsten, and molybdenum. Other deNOx catalyst compositions can be zeolite-based that typically is used in high-temperature applications, and the deNOx catalyst composition may be a precious metal catalyst for use in low-temperature applications.

U.S. Pat. No. 6,419,889 discloses suitable deNOx catalyst compositions that are useful as the SCR catalyst of an inventive process. This patent is incorporated herein by reference. It describes a titania extrudate particle impregnated with one or more active deNOx metals such as vanadium, molybdenum, and tungsten that may suitably be used as an SCR catalyst of the invention.

Examples of suitable ceramic or metallic foam deNOx catalysts that are useful as an SCR catalyst of the inventive process include those described in WO 2017/112615. This publication is incorporated herein by reference. The ceramic foam is made by filling the pores of a foamed polymer with aqueous slurry of a ceramic material and drying and calcining the wet foam so that the polymer vaporizes or is burned. The metallic foam is made by a powder metallurgical process that converts a nickel or iron foam into a high-temperature alloy. Incorporated onto the ceramic or metal foam is a suitable active deNOx metal as described herein.

U.S. Pat. No. 8,758,711 gives examples of suitable honeycomb structures and deNOx catalyst compositions. This patent is incorporated herein by reference. These catalysts comprise a carrier, having a honeycomb structure with a plurality of through holes providing a reaction flow path. The carrier may further comprise an oxide compound of one or more elements selected from the group consisting of Si, B, P, Zr, and W. Incorporated into the honeycomb structured carrier is an active deNOx metal selected from the group consisting of $V_2O_5$, $WO_3$, and $MoO_3$.

The first SCR system is any system that can be integrated into the first flue gas processing system of the process and is capable of functioning as described herein. The first SCR system receives the first processed flue gas stream, comprising nitrogen oxides and sulfur compounds, that passes from the first particulates removal unit. The first SCR system provides means and method for removing the nitrogen oxides from the first processed flue gas stream to yield a first denitrified flue gas stream that preferably is discharged into a stack.

The parallel flue gas processing line or system is an integrated system similar to the first flue gas processing system. Included among its components in addition to its furnace or boiler are a second gas removal unit, a second particulates removal unit, and a second SCR system. The second SCR system provides means and method for removing the nitrogen oxides from the second processed flue gas stream to yield a second denitrified flue gas stream that preferably is discharged into a stack.

The first SCR system has an upstream inlet for receiving the first processed flue gas stream and a downstream outlet for discharging the first denitrified flue gas stream. The first SCR system defines a contacting zone that contains a deNOx catalyst as described above Ammonia or urea is introduced into and mixed with the first processed flue gas stream that passes to and is introduced into the contacting zone of the first SCR system wherein it is contacted with the first SCR catalyst under nitrogen oxide reduction, i.e., deNOx, reaction conditions providing for the catalytic reduction of the nitrogen oxides of the first processed flue gas stream to nitrogen and water.

Suitable deNOx reaction conditions include a reaction pressure in the range of from −10 kPa (gauge) to 2000 kPa (gauge) and a reaction or contacting temperature in the range of from 130° C. to 450° C. In the normal operation of an SCR system for removal or reduction of NOx contained in a processed flue gas stream, the space velocity is in the range of from 3,000 $hr^{-1}$ to 100,000 $hr^{-1}$, more typically, from 3,000 $hr^{-1}$ to 50,000 $hr^{-1}$, and most typically, from 5,000 $hr^{-1}$ to 20,000 $hr^{-1}$.

The first SCR system is operated by passing the first processed flue gas stream to the first SCR system and introducing it into the contacting zone of the first SCR system through the upstream inlet. The first denitrified flue gas stream, having a reduced nitrogen oxides concentration as compared to the first processed flue gas stream, is yielded from the first SCR system through the downstream outlet of the first SCR system and discharged into a stack and to the atmosphere. The first processed flue gas stream is contacted with the first SCR catalyst over a continuous time-period that is sufficient to provide a deactivated first SCR catalyst. The first SCR catalyst becomes deactivated by sulfur compounds through the mechanism described above.

A typical contacting time for deactivation of the first SCR catalyst is in the range of from 1 to 16,000 hours, more typically, the contacting time is in the range of from 200 to 8,000 hours. These deactivation times are for the typical space velocities required for treating the first processed flue gas stream.

Once the first SCR catalyst becomes deactivated to a level that it is no longer removing nitrogen oxides from the first processed flue gas stream to an acceptable or desirable level, passing of the first processed flue gas stream to the first line is stopped and the flow of flue gas to the SCR system is discontinued. Further, the first SCR system is isolated to provide a closed system. The deactivated first SCR catalyst of the isolated first SCR system then undergoes regeneration.

The first SCR system is isolated by any suitable means or method known to those skilled in the art. Preferably, this is done by blocking-off gas flow in the conduit providing gas communication between the upstream inlet of the first SCR system and other treatment units of the first flue gas processing system and by blocking-off gas flow in the conduit providing gas communication between the downstream outlet of the first SCR system and the stack of the first flue gas processing system. An upstream damper or valve means provides for blocking or stopping the flow of the first processed flue gas stream to the first SCR system and a downstream damper or valve means provides for blocking or stopping the flow of the first denitrified gas stream from the first SCR system to the stack or atmosphere.

To regenerate the deactivated first SCR catalyst the closed system is initially filled with a regeneration gas taken from the parallel flue gas processing system. A portion of the second denitrified flue gas stream is introduced at an introduction rate into the closed system of the first flue gas processing system. The introduced second denitrified flue gas is circulated as a regeneration gas at a circulation rate through the closed system and passed over the deactivated first SCR catalyst to provide for regeneration of the deactivated first SCR catalyst and to yield a regeneration effluent gas that contains SOx and ammonia. SOx and ammonia are regeneration products driven from the deactivated first SCR catalyst by the regeneration.

The inventive regeneration method is particularly useful for numerous reasons. When there are parallel flue gas treatment lines, the method allows for the regeneration of one of the lines while it is shut down, since processed flue gas as a feed for regeneration can be provided from the other parallel line that is in operation. The regeneration effluent gases can be vented to upstream of the flue gas processing system of the other parallel line in operation. Another advantage of the inventive method for regenerating the deactivated first SCR catalyst is that it provides for an energy efficient regeneration method requiring less energy usage than alternative methods of regeneration.

In the regeneration method, the temperature of the regeneration gas required for the regeneration of the deactivated first SCR catalyst is higher than the temperature of the second denitrified flue gas stream of the second SCR system that is charged to the closed system. But, because the regeneration gas is circulated within the closed system, a minimal amount of incremental heat input is required to maintain the regeneration temperature of the circulating gas.

The required incremental heat input approaches that which is needed to increase the temperature of the portion of the second denitrified flue gas stream introduced into the closed system to the temperature of the circulating regeneration gas within the closed system and to compensate for heat losses.

In a preferred embodiment of the inventive regeneration method, the portion of the second denitrified flue gas stream is continuously introduced or fed as regeneration gas into the closed system. This regeneration gas is introduced into the first SCR system through its upstream inlet and is passed over the deactivated first SCR catalyst to provide for its regeneration. The regeneration effluent gas, comprising the regeneration products of SOx and ammonia, passes from the first SCR system by way of its downstream outlet and is circulated at a circulation rate through the closed system from the downstream outlet to the upstream inlet.

In order to remove the regeneration products from the circulating regeneration effluent gas, a portion of the regeneration effluent gas is removed from the closed system at a removal rate sufficient to continuously remove regeneration products from the circulating regeneration effluent gas of the closed system. The withdrawn regeneration effluent gas passes from the closed system and is introduced into the parallel flue gas processing system. This parallel flue gas treating system is described above. The second acid gas removal unit, the second particulate removal unit and the second SCR system each of the parallel flue gas treating system provide for processing of a second flue gas stream supplied by an associated boiler to yield the second denitrified flue gas stream a portion of which is introduced into the closed system. The withdrawn regeneration effluent gas, thus, preferably is treated by the parallel flue gas processing system to remove at least a portion of the SOx and ammonia contained in the withdrawn regeneration effluent gas.

It is preferred to control the amount of second denitrified flue gas stream that is continuously introduced or fed into the closed system by flow control and to control the removal rate of the circulating regeneration effluent gas also by flow control provided that the removal rate is sufficient to continuously remove regeneration products but not too high to exceed the capacity of the acid gas removal unit or other components of the parallel flue gas treating system that it is fed into. But any suitable means or method may be used to control the feed or introduction rate of the second denitrified flue gas stream into the closed system and to control the removal rate of regeneration effluent gas from the closed system.

As earlier mentioned, the regeneration temperature of the circulating regeneration effluent gas is maintained at a temperature that is higher than the temperature of the second denitrified flue gas stream that is introduced into the closed system. The regeneration temperature needs to be greater than 220° C., and, typically, it is in the range of from 220° C. to 500° C., preferably, from 275° C. to 400° C. Heat energy is introduced, typically by direct or indirect heat exchange with a heat source, into the circulating regeneration gas to maintain or control the regeneration temperature.

The inventive process provides for a small volume of the second denitrified flue gas that is passed over the deactivated first SCR catalyst to restore catalytic activity when compared to the volume of regeneration gas required for other methods of regeneration. To increase the space velocity and improve the regeneration efficiency of the inventive regeneration process, recirculation of part or all of the regeneration gas through the deactivated first SCR catalyst is applied instead of applying the conventional method of using fresh processed flue gas as a once-through or single-pass regeneration gas. The combination of a small volumetric flow of the second denitrified flue gas required to be passed over the deactivated first SCR catalyst and recirculation of regeneration gas reduces the energy requirement compared to the once-through regeneration.

Thus, the space velocity through the first SCR system of the circulating regeneration effluent gas should be less than the typical space velocities of the processed flue gas stream during the use of the first SCR system for deNOx treatment. The regeneration space velocity of the circulating regeneration effluent gas, thus, should be less than 3,000 hr$^{-1}$, and, preferably, it is less than 2,500 hr$^{-1}$, and even less than 2,000 hr$^{-1}$. The regeneration space velocity, therefore, typically is in the range of from 10 hr$^{-1}$ to 3,000 hr$^{-1}$, or of from 10 hr$^{-1}$ to 2,500 hr$^{-1}$ or 2,000 hr$^{-1}$. The regeneration pressure within the closed system can be in the range of from −10 kPa to 2,000 kPa.

The regeneration gas is circulated through the closed system for a circulation time that is sufficient to regenerate the deactivated first SCR catalyst by restoring at least a portion of its reduced activity. The circulation time can be in the range of from 10 hours to 240 hours. More typically, the circulation time is in the range of from 20 hours to 100 hours.

Once an enough activity is restored to the deactivated first SCR catalyst, the regeneration is stopped by discontinuing the introduction of the second denitrified flue gas into the closed system and by removing the regeneration effluent gas from the closed system. The closed system is then reopened and the first processed flue gas stream is again passed to the SCR system to be treated for the removal of nitrogen oxides to yield the first denitrified flue gas stream.

The FIGURE presents a process flow diagram showing an embodiment of the inventive process system 10. Process system 10 includes parallel fuel gas treatment lines or systems each of which treat and process combustion fuel gas streams generated by separate furnaces or boilers. These parallel fuel gas treatment lines include first flue gas treating system 12 and parallel or second flue gas treating system 14.

First flue gas treating system 12 provides for the treatment of combustion flue gases generated by first furnace or boiler 16, and parallel flue gas treating system 14 provides for the treatment of combustion flue gases generated by second furnace or boiler 20. First flue gas treating system 12 includes first acid gas removal unit 18, first particulates removal unit 24, and first SCR system 26. Parallel flue gas treating system 14 includes second acid gas removal unit 28, second particulates removal unit 30, and second SCR system 32. Each of the parallel flue gas treating lines provide for processing and treating separately generated combustion flue gas streams to remove from them nitrogen oxides, sulfur oxides, and particulates before releasing the resulting treated flue gas streams, or denitrified flue gas streams, into the atmosphere.

First furnace 16 defines combustion zone 36 and heat transfer zone 38 and provides means for burning or combusting a fuel source. The fuel source is introduced into combustion zone 36 through line 40 and combustion air is introduced through line 42. The combustion generates a hot first flue gas stream that is discharged and passes from furnace 16 through line 44. The first flue gas stream includes nitrogen oxides, sulfur oxides, and particulates.

The combustion flue gas may be treated in furnace 16 for the removal of nitrogen oxides by the application of a selective non-catalytic reduction reaction within furnace 16. To accomplish this, ammonia or urea is introduced through line 48 into either combustion zone 36 or heat transfer zone 38 at a location where the temperature of the hot flue gas is in the range of from 760° C. to 1,000° C.

The first flue gas stream passing through line 44 is introduced into first acid gas removal unit 18. In this embodiment of the inventive process, first acid gas removal unit 18 first processes the hot first flue gas stream to yield a first desulfurized flue gas stream before its further processing to remove particulates from the first desulfurized flue gas stream. In an alternative embodiment of the inventive process, the order of flue gas treatment is reversed with the hot first flue gas stream first being treated by a particulates removal unit to remove particulates and to provide a cleaned gas stream that is treated by an acid gas removal unit to provide a first desulfurized flue gas stream or a first processed flue gas stream. In the instant embodiment, first acid gas removal unit 18 is of the type known in the art as a dry or semi-dry acid gas removal system, which may use sorbent injection in a dry or slurry form. The application of this type of treatment system yields a first desulfurized gas stream with no or minimum added moisture to the flue gas except that which may be introduced by evaporation from the alkaline sorbent slurry. In the alternative embodiment, the type of acid gas removal unit is a wet scrubber that yields a saturated desulfurized flue gas stream that passes from the acid gas removal unit at its dew point.

First acid gas removal unit 18 defines first acid gas removal zone 52 within which the first flue gas stream is contacted with a slurry or dry powder of an alkaline sorbent. First acid gas removal unit 18 provides means for contacting the slurry or dry powder of alkaline sorbent that is introduced into first acid gas removal zone 52 by way of line 54 with the first flue gas stream of line 44 that comprises acid gases. Reaction products of the alkaline sorbent with the acid gases pass from first acid gas removal unit 18 through line 56 for further processing or disposal. The portion of reaction products not recovered by first acid gas removal unit 18 may pass with the first desulfurized gas stream to first particulates removal unit 24.

The treatment of the first flue gas stream by first acid gas removal unit 18 yields a first desulfurized flue gas stream that passes from first acid gas removal unit 18 by way of line 58 and is introduced into first particulates removal zone 60 defined by first particulates removal unit 24. First particulates removal unit 24 provides means for removing particulates, including the reaction products from first acid gas removal unit 18, from the first desulfurized flue gas stream to yield a first processed flue gas stream having a reduced particulates concentration. The removed particulates reaction products from acid gas removal unit 18 pass from first particulates removal unit 24 by way of line 62.

The first processed flue gas stream passes from first particulates removal unit 24 through conduit 64 into which ammonia is introduced by way of line 68 to be mixed with the processed flue gas stream prior to passing the mixture to first SCR system 26. First SCR system 26 provides means for the catalytic reduction of the nitrogen oxides contained in the processed flue gas stream to molecular nitrogen and water.

First SCR system 26 includes structure that defines first contacting zone 70, which includes first deNOx catalyst 72. First deNOx catalyst 72 may be contained within modules that in combination with other structural elements of first SCR system 26 direct or provide for the flow of the first processed flue gas stream across first deNOx catalyst 72 and provides for contacting of the first processed flue gas stream with first deNOx catalyst 72.

First SCR system 26 has upstream inlet 74 for receiving a feed gas, such as the processed flue gas stream that comprises nitrogen oxide compounds, and downstream outlet 76 for discharging and yielding from first SCR system 26 a first treated process stream, such as a first treated processed flue gas stream or first denitrified flue gas stream.

The first processed flue gas stream is introduced into first contacting zone 70 wherein it is contacted with first deNOx catalyst 72 under suitable deNOx reaction conditions to yield a first denitrified flue gas stream. The first denitrified flue gas stream passes from first contacting zone 70 through conduit 78 to stack 84.

Passing and contacting of the first processed flue gas with first deNOx catalyst 72 continues for a sufficient contacting time to provide for a deactivated first SCR catalyst 72 that is deactivated by sulfur compounds. Once first deNOx catalyst 72 is sufficiently deactivated, charging of the first processed flue gas stream to first SCR system 26 is stopped and first SCR system 26 is isolated to provide isolated or closed system 86.

To isolate first SCR system 26, upstream damper or valve means 88 is interposed into conduit 64 at a location between the outlet of first particulates removal unit 24 and upstream inlet 74 of first SCR system 26, and downstream damper or valve means 90 is interposed into conduit 78 at a location between downstream outlet 76 of first SCR system 26 and stack 84. Both upstream damper 88 and downstream damper 90 are closed to block-off gas flow communication to and from first SCR system 26 and to provide for closed system 86. Circulating line 94 provides for fluid communication from downstream outlet 76 to upstream inlet 74 to allow circulating flow within closed system 86.

By-pass line 98 provides for flow of the first processed flue gas stream passing from first particulates removal unit 24 to by-pass first SCR system 26 and closed system 86. By-pass line 98 provides gas flow communication from conduit 64 at a location between the outlet of first particulates removal unit 24 and the inlet of upstream damper 88 to conduit 78 at a location between the outlet of downstream damper 90 and stack 84. When first SCR system 26 is isolated by closing both upstream damper 88 and downstream damper 90, the first processed flue gas stream passes from first particulates removal unit 24 and by-passes first SCR system 26 and closed system 86 by way of line 98 to conduit 78 and stack 84.

The regeneration of the deactivated first SCR catalyst 72 includes filling closed system 86 with a portion of the second denitrified flue gas stream yielded from second SCR system 32 of parallel gas treating system 14. The portion of the second denitrified flue gas stream introduced into closed system 86 works as a regeneration gas used to regenerate the deactivated first deNOx catalyst 72.

Second SCR system 32 treats and processes the second processed flue gas stream in the same way as first SCR system 26 processes the first processed flue gas stream, and second SCR system 32 yields the second denitrified flue gas stream. The second denitrified flue gas stream passes from second contacting zone 102 by way of line 104 for discharge into the atmosphere. The discharge of the second denitrified flue gas may optionally be into stack 84 or into a separate stack (not shown). The second denitrified flue gas stream is supplied to closed system 86 by passing a portion of the second denitrified flue gas stream from line 104 through line 106 and introducing it into line 94 of closed system 86.

The second processed flue gas stream of parallel gas treating system 14 is the second flue gas stream generated by furnace 20 and passing from furnace 20 through line 108 and that has been processed and treated in any order by second acid gas removal unit 28 and second particulates removal unit 30. In this embodiment, the second processed flue gas stream passes from particulates removal unit 30 through line 100 and is charged to second SCR system 32.

Interposed within line 106 is control valve 110 that provides means for controlling the rate at which the second denitrified flue gas is introduced into closed system 86. The rate of flow of the second denitrified flue gas introduced into circulating line 94 of closed system 86 is measured by flow sensor and transmitter means 112. Flow transmitter means 112 provides signal 114 to flow controller 112 that is representative of the rate of flow of second denitrified flue gas passing through line 106. Flow controller 112 compares this measured flow rate against a desired flow rate to thereby provide a differential flow rate. Flow controller 116 adjusts control valve 110 in response to the differential flow rate to maintain the rate of flow of second denitrified flue gas passing through line 106 and introduced into circulating line 94 of closed system 86 at the desired flow rate.

The regeneration gas is circulated at a circulation rate through circulating line 94 of closed system 86 and passes over the deactivated first SCR catalyst 72 to provide for its regeneration and to yield a regeneration effluent gas that contains SOx and ammonia. The regeneration effluent gas passes from first SCR system 26 through downstream outlet 76 and is circulated through the closed system 86 through circulation line 94.

In order to continuously remove regeneration products contained in the circulating regeneration effluent gas, a bleed or slip stream is removed from the circulating regeneration effluent by way of line 120 and is passed and introduced into line 108 of parallel gas treating system 12 where it is combined with the second flue gas stream passing to second acid gas removal unit 28. Second denitrified flue gas is continuously introduced as a regeneration gas into line 94 of closed system 86 through line 106 while an equivalent bleed stream of the circulating regeneration effluent gas is simultaneously removed from closed system 86 through line 120.

Once an enough activity is restored to the deactivated first SCR catalyst 72, the regeneration is stopped by discontinuing introduction of the second denitrified flue gas through line 106 into closed system 86 and by discontinuing removal of the regeneration effluent gas through line 120 from closed system 86. Closed system 86 is then reopened by opening both upstream damper 88 and downstream damper 90, stopping the by-passing through by-pass line 98 of the first processed flue gas stream around first SCR system 26, and restoring the passing of the first processed flue gas stream to first SCR system 26 for treatment to remove nitrogen oxides so as to yield the first denitrified flue gas stream that passes from first SCR system 26 through line 78 to stack 84.

After the deactivated first SCR catalyst 72 is regenerated by the above-described method and the operation of first flue gas treating system 12 is restored to normal operation, a similar regeneration process may be applied to regenerate second SCR catalyst 130 of second SCR system 32 that has become deactivated. The regeneration of a deactivated first SCR catalyst 72 may then thereafter be repeated.

That which is claimed is:

1. A process for selective catalytic reduction of nitrogen oxides contained in a gas stream and regeneration of a deactivated SCR catalyst, wherein said process comprises:
providing a first processed flue gas stream, containing nitrogen oxides and sulfur compounds, and a second processed flue gas stream, containing nitrogen oxides and sulfur compounds;
passing said first processed flue gas stream to a first SCR system having an upstream inlet and a downstream outlet that includes a first SCR catalyst and contacting said first processed flue gas stream with said first SCR catalyst in the presence of ammonia for a time sufficient to provide a deactivated first SCR catalyst deactivated by sulfur compounds and yielding from said first SCR system a first denitrified flue gas stream for discharge into a stack;
passing said second processed flue gas stream to a second SCR system that includes a second SCR catalyst and yielding from said second SCR system a second denitrified flue gas stream for discharge;
discontinuing said step of passing said first processed flue gas stream to said first SCR system by isolating said first SCR system to provide a closed system;
introducing at an introduction rate a portion of said second denitrified flue gas stream into said closed system as a regeneration gas used to regenerate said first SCR catalyst and to yield a regeneration effluent gas containing SOx and ammonia; and circulating at a circulation rate all or part of said regeneration effluent gas from said downstream outlet to said upstream inlet; and
removing at a removal rate a portion of said regeneration effluent gas from said closed system and introducing said portion of said regeneration effluent gas into a parallel flue gas treating system that includes a second acid gas removal unit, a second particulate removal unit and said second SCR system, wherein said parallel flue gas treating system provides for removing at least a portion of the SOx and ammonia contained in said regeneration effluent gas of said first SCR system.

2. The process as recited in claim 1, further comprising:
burning a combustible material within a first furnace component of a flue gas treating system and yielding therefrom a first flue gas stream, comprising nitrogen oxides, acid gas components, and particulates;
treating said first flue gas stream by a first acid gas removal unit to remove a portion of the acid gas components from said first flue gas stream and to yield a first desulfurized flue gas stream; and
removing particulates from said first flue gas stream or said first desulfurized flue gas stream by a first particulate removal unit to yield said first processed flue gas stream.

3. The process as recited in claim 2, further comprising:
removing a portion of said nitrogen oxides in said first flue gas stream by introducing either ammonia or urea or both into said first furnace to induce selective non-catalytic reduction of said nitrogen oxides.

4. The process as recited in claim 3, further comprising:
introducing heat energy into said regeneration effluent gas of said closed system to thereby control a regeneration temperature of said regeneration gas.

5. The process as recited in claim 4, further comprising:
measuring said system pressure and comparing said system pressure against a desired system pressure to provide a differential system pressure; and
adjusting said portion of said second denitrified flue gas stream that is introduced into said closed system in response to said differential system pressure to maintain said system pressure at said desired system pressure.

6. The process as recited in claim 5, further comprising:
measuring said removal rate of said portion of said regeneration effluent gas to provide a measured removal rate and comparing said measured removal rate against a desired removal rate to provide a differential removal rate; and adjusting said removal rate in response to said differential removal rate to maintain said removal rate at said desired removal rate.

7. The process as recited in claim 6, further comprising:

measuring said circulation rate of said regeneration gas to provide a measured circulation rate and comparing said measured circulation rate against a desired circulation rate to provide a differential circulation rate; and adjusting said circulation rate in response to said differential circulation rate to maintain said circulation at said desired circulation rate.

8. The process as recited in claim 1, further comprising:

burning a first combustible material within a first furnace component with a downstream flue gas treating system and yielding therefrom a first flue gas stream, comprising nitrogen oxides, acid gas components, and particulates;

removing particulates from said first flue gas stream by a first particulate removal unit to provide a first cleaned gas stream; and treating said cleaned flue gas stream by an acid gas removal unit to remove acid gas components from said first cleaned flue gas stream and to yield a first desulfurized flue gas stream as said first processed flue gas stream to said first SCR system.

9. The process as recited in claim 8, further comprising:

removing a portion of said nitrogen oxides in said first flue gas stream by introducing either ammonia or urea or both into said first furnace to induce selective non-catalytic reduction of said nitrogen oxides.

10. The process as recited in claim 9, further comprising:

introducing heat energy into said regeneration gas of said closed system to thereby control a regeneration temperature of said regeneration gas.

11. The process as recited in claim 10, further comprising:

measuring said system pressure and comparing said system pressure against a desired system pressure to provide a differential system pressure; and adjusting said portion of said second denitrified flue gas stream that is introduced into said closed system in response to said differential system pressure to maintain said system pressure at said desired system pressure.

12. The process as recited in claim 11, further comprising:

measuring said removal rate of said portion of said regeneration effluent gas to provide a measured removal rate and comparing said measured removal rate against a desired removal rate to provide a differential removal rate; and adjusting said removal rate in response to said differential removal rate to maintain said removal rate at said desired removal rate.

13. The process as recited in claim 12, further comprising:

measuring said circulation rate of said regeneration gas to provide a measured circulation rate and comparing said measured circulation rate against a desired circulation rate to provide a differential circulation rate; and adjusting said circulation rate in response to said differential circulation rate to maintain said circulation at said desired circulation rate.

14. The process as recited in claim 1, further comprising:

passing said first processed flue gas stream around said closed system as a by-pass stream and passing said by-pass stream to said stack.

15. The process as recited in claim 4, further comprising:

measuring said introduction rate of said portion of said second processed flue gas to provide a measured introduction rate and comparing said measured introduction rate against a desired introduction rate to provide a differential introduction rate; and adjusting said introduction rate of said portion of said second processed flue gas stream in response to said differential introduction rate to maintain said introduction rate at said desire introduction rate.

* * * * *